US008752149B2

(12) United States Patent
Emura et al.

(10) Patent No.: US 8,752,149 B2
(45) Date of Patent: Jun. 10, 2014

(54) DEVICE FOR SHARING ANONYMIZED INFORMATION, AND METHOD FOR SHARING ANONYMIZED INFORMATION

(75) Inventors: Koichi Emura, Kanagawa (JP); Seiya Miyazaki, Hyogo (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/814,051

(22) PCT Filed: Jul. 22, 2011

(86) PCT No.: PCT/JP2011/004144
§ 371 (c)(1),
(2), (4) Date: Feb. 4, 2013

(87) PCT Pub. No.: WO2012/017612
PCT Pub. Date: Feb. 9, 2012

(65) Prior Publication Data
US 2013/0133050 A1 May 23, 2013

(30) Foreign Application Priority Data
Aug. 6, 2010 (JP) ................................ 2010-177540

(51) Int. Cl.
*H04L 29/06* (2006.01)
*G06F 21/62* (2013.01)

(52) U.S. Cl.
CPC ........ *H04L 63/0407* (2013.01); *H04L 63/0421* (2013.01); *H04L 63/083* (2013.01); *G06F 21/6254* (2013.01)
USPC .................................................. 726/6; 726/5

(58) Field of Classification Search
CPC ............ G06F 21/6254; H04L 63/0407; H04L 63/0421; H04L 63/083
USPC ........................................................ 726/5, 6
See application file for complete search history.

(56) References Cited

U.S. PATENT DOCUMENTS 6,425,081 B1 * 7/2002 Iwamura ........................ 713/176
(Continued)

FOREIGN PATENT DOCUMENTS

| JP | 2007-058590 A | 3/2007 |
|----|---------------|--------|
| JP | 2008-226133 A | 9/2008 |
| WO | 2008/069011 A1 | 6/2008 |

OTHER PUBLICATIONS

Beaver et al., A Design for Anonymous, Authenticated Information Sharing, Jun. 2001, Retrieved from http://citeseerx.ist.psu.edu/viewdoc/download?doi=10.1.1.119.795&rep=rep1&type=pdf.*

(Continued)

*Primary Examiner* — Chau Le
(74) *Attorney, Agent, or Firm* — Pearne & Gordon LLP

(57) ABSTRACT

A device (300s) has an authentication ID generator (320) for applying a first one-way function to a combination of a process password and information to be shared, and generating an authentication ID; an anonymizer (330) for generating anonymized information from the authentication ID and the information to be shared; an information sharing section (340) for causing the anonymized information to be held on another device; and an anonymized information process requesting section (350) for sending a process request containing the process password, and requesting the other device to subject the held anonymized information to a predetermined process, the request being sent on the basis of a match between the authentication ID of the anonymized information and the result of the first one-way function being applied to the combination of the process password and the anonymized information held on the other device.

5 Claims, 14 Drawing Sheets

(56) References Cited

U.S. PATENT DOCUMENTS

| | | | |
|---|---|---|---|
| 7,565,702 B2* | 7/2009 | Jakubowski et al. | 726/28 |
| 8,661,423 B2* | 2/2014 | Agrawal et al. | 717/154 |
| 2005/0081045 A1* | 4/2005 | Nicodemus et al. | 713/182 |
| 2010/0034376 A1* | 2/2010 | Okuizumi et al. | 380/44 |
| 2010/0064354 A1* | 3/2010 | Irvine | 726/5 |
| 2010/0199098 A1* | 8/2010 | King | 713/182 |
| 2011/0078775 A1* | 3/2011 | Yan | 726/6 |
| 2011/0110568 A1* | 5/2011 | Vesper et al. | 382/128 |

OTHER PUBLICATIONS

Kazuki Otsu, et al., "Access Seigo Kiko o Motsu P2P File Kyoyu System", 2005 Nen Symposium on Cryptography and Information Security (SCIS2005) Yokoshu, vol. 1, pp. 13-18, The Institute of Electronics, Information and Communication Engineers Joho Security Kenyu Senmon Iinkai et al., Jan. 25, 2005, Outline, p. 14, right column, lines 16-25, p. 17, left column, lines 3-21, fig. 2.

International Search Report for PCT/JP2011/004144 dated Sep. 27, 2011.

* cited by examiner

DEVICE FOR SHARING ANONYMIZED INFORMATION, AND METHOD FOR SHARING ANONYMIZED INFORMATION

TECHNICAL FIELD

The claimed invention relates to an apparatus and a method for sharing anonymized information with other apparatuses, the sender of the anonymized information being anonymous.

BACKGROUND ART

For the purpose of allowing the police and/or the like to promptly deal with calling reports from mobile phones, there has been proposed legislation that requires each mobile phone to include a function of identifying the current position, of the mobile phone. In addition, mobile phones including a global positioning system (GPS) installed therein have been widespread along with such a proposal. Meanwhile, the third-generation mobile communication network has made the connection from a mobile phone to the Internet easier.

With this technical background, there have been introduced various services using the Internet and acquisition of position information on condition that the GPS function is always activated as a standby application in recent years. Examples of such services include what are called life stream services or life log services (hereinafter collectively referred to as "life stream services") in which a series of information having position information is shared with other people as an activity history of the user.

In life stream services, the receiver of information needs to re-identify the provider of the information (i.e., sender). This is because the receiver needs to verify that a plurality of pieces of information provided by a certain user are all provided by the same user. Meanwhile, from a viewpoint of ensuring privacy, a sender of an individual piece of information to be shared must be anonymized.

Hence, in such services, typically, identification information other than personal information, such as a handle name may be used to identify the sender of information. Anonymization refers to making information (i.e., personal information) that can identify the sender unknown to anyone. In addition, information the sender of which is anonymous is referred to as "anonymized information."

Meanwhile, applying life stream services to various services or systems used for health management, or monitoring of disease has been attracting attention. Some examples of such services and systems include a lifestyle improvement application service provider (ASP) service, a health management system for seniors, an active mass meter, and a sphygmomanometer with a communication function.

For example, medical information, i.e., medical records of patients are conventionally stored by each medical institution. In addition, there is a system in which electric medical charts formed by computerizing the medical information indicating medical records of patients, such as electric medical records (EMRs) are shared by a plurality of medical institutions on a network. Such a system, however, has not prevailed because of the necessity of significant investment.

In contrast, as an application to health enhancement, disease prevention, and medical treatment, introduction of a personal health record (PHR) is expected in which individuals collect, record, and use their physical information, activity information, medical treatment information, prescription information, and the like.

The application of the above-described life stream services to PHRs allows a medical institution to easily acquire physical information, activity information, and the like in addition to the medical information on users stored in each medical institution and thus to know the lifestyles of the users. Furthermore, applying the above-described life stream services to PHRs enables individuals to manage health management information while associating information indicating where they have run as training, with health management information, and also share part of the information with friends or make part of the information publicly available.

However, any one who accesses the information can search for and access information about the vicinity of the position where he or she was at and find information of other persons about incidents that happened in the vicinity. Thus, the anonymity of the sender of the anonymized information may be lost from the position information and/or the like of anonymized information, depending on a situation.

For example, let us suppose that a certain user finds information posted in a life stream service by someone and indicating that he or she is at a certain bus stop at a specific time after the user and a resident in the neighborhood stayed together at the certain bus stop at the specific time. In this case, the user identifies the person who posted the information as the resident who stayed together with the user at the certain bus stop at the specific time.

Such a situation can be prevented if the sender of the anonymized information modifies or deletes anonymized information according to the situation. Thus, it is preferable that the sender of anonymized information can perform a process on its anonymized information even after the anonymized information has been shared, and can substantially put its anonymized information under the control of the sender.

In this respect, a technique that is disclosed in PTL 1 and that enables the sender of anonymized information to continuously manage the anonymized information may be applied to the life stream service.

FIG. 1 is a block diagram showing a configuration of an anonymized information sharing apparatus disclosed in PTL 1.

As shown in FIG. 1, anonymized information sharing apparatus 10 includes personal ID storage section 11 and anonymization number generating section 12. Personal ID storage section 11 acquires the personal ID number used for identifying the sender of anonymized information, and anonymization number generating section 12 applies a uni-directional function to the personal ID number to create an anonymization number.

Anonymized information sharing apparatus 10 manages a correspondence table in which pieces of anonymized information are associated with respective anonymization numbers. Anonymized information sharing apparatus 10 allows correspondence table discarding section 13 to discard the correspondence table when deemed necessary. Upon receiving a personal ID and a request for executing a predetermined process about anonymized information, anonymized information sharing apparatus 10 allows anonymization number generating section 12 to recreate the anonymization number from the received personal ID. Then, anonymized information sharing apparatus 10 performs the requested process on the anonymized information associated with the recreated anonymization number.

With this configuration, in the case where the anonymized information has been shared by other apparatuses, anonymized information sharing apparatus 10 can allow a sender of anonymized information to continuously manage the anonymized information while maintaining the anonymity of the anonymized information against apparatuses other than the sender and the recipient of the anonymized information.

CITATION LIST

Patent Literature

PTL 1
International Publication Pamphlet No. 2008/069011

SUMMARY OF INVENTION

Technical Problem

The technique disclosed in PTL 1 is effective in a centralized-management network in which retention of anonymized information and management of the anonymization number performed in a single apparatus, such as a system in a hospital in which the authority is centralized in a single place.

The technique disclosed in PTL 1, however, has a problem that it is difficult to continuously manage the anonymized information in the above-described system in which a definite or indefinite number of persons post or browse information, such as twitter (registered trademark) or in a decentralized management network in which specific terminals directly communicate with each other such as a peer-to-peer (P2P) system. This is because, in such networks, anonymized information that has been shared through, for example, posting (i.e. anonymized information shared by indefinite recipients) needs to be deleted.

It is an object of the claimed invention to provide an apparatus and a method for sharing anonymized information that are capable of allowing a sender of the anonymized information to continuously manage the anonymized information shared in decentralized management network.

Solution to Problem

An anonymized information sharing apparatus according to the claimed invention shares anonymized information with another apparatus, a sender of the anonymized information being anonymous. The apparatus includes: an authentication ID generating section that generates, for each piece of information to be shared, an authentication ID by applying a first unidirectional function to a combination of part or all of the information to be shared and a process password; an anonymizing section that generates the anonymized information by adding the generated authentication ID to the information to be shared; an information sharing section that sends the generated anonymized information to the other apparatus and causes the other apparatus to hold the generated anonymized information; and an anonymized information processing requesting section that generates and transmits a process request containing the process password to the other apparatus and requests the other apparatus to perform a predetermined process on the anonymized information held by the other apparatus on the basis of a match between the authentication ID of the anonymized information held in the other apparatus and a result obtained by applying the first unidirectional function to the combination of part or all of the anonymized information held in the other apparatus and the process password, the predetermined process being permitted only by the sender.

An anonymized information sharing apparatus according to the claimed invention shares anonymized information with another apparatus, the anonymized information containing information to be shared and an authentication ID and a sender of the anonymized information being anonymous. The apparatus includes: an information sharing section that holds the anonymized information sent from the other apparatus; and an anonymized information processing section that, upon receiving a process request containing a process password from the other apparatus, determines to perform a predetermined process on the anonymized information on the basis of a match between the authentication ID of the anonymized information and a result obtained by applying a first unidirectional function to combination of part or all of the information to be shared of the anonymized information and the process password for each piece of the anonymized information held in the information sharing section.

A method of sharing anonymized information according to the claimed invention is a method of sharing anonymized information, a sender of the anonymized information being anonymous, the method including: generating, for each piece of information to be shared, an authentication ID by applying a first uni-directional function to a combination of part or all of the information to be shared and a process password; generating the anonymized information by adding the generated authentication ID to the information to be shared; sending the generated anonymized information to the other apparatus and causing the other apparatus to hold the generated anonymized information; and generating and transmitting a process request containing the process password to the other apparatus and requesting the other apparatus to perform a predetermined process on the anonymized information held by the other apparatus on the basis of a match between the authentication ID of the anonymized information held in the other apparatus and a result obtained by applying the first unidirectional function to the combination of part or all of the anonymized information held in the other apparatus and the process password, the predetermined process being permitted only by the sender.

Advantageous Effects of Invention

According to the claimed invention, only apparatus that has sent anonymized information can maintain the anonymized status of the anonymized information, can authenticate a process request having the process authority for the anonymized information, and can allow apparatus that holds the anonymized information to perform a predetermined process on the anonymized information. That is, the claimed invention can allow an apparatus that has sent anonymized information to continuously manage the anonymized information shared in a decentralized management network.

DESCRIPTION OF EMBODIMENTS

Embodiments of the claimed invention will be hereinafter described in detail with reference to the accompanying drawings.

Embodiment 1

Figure 1:
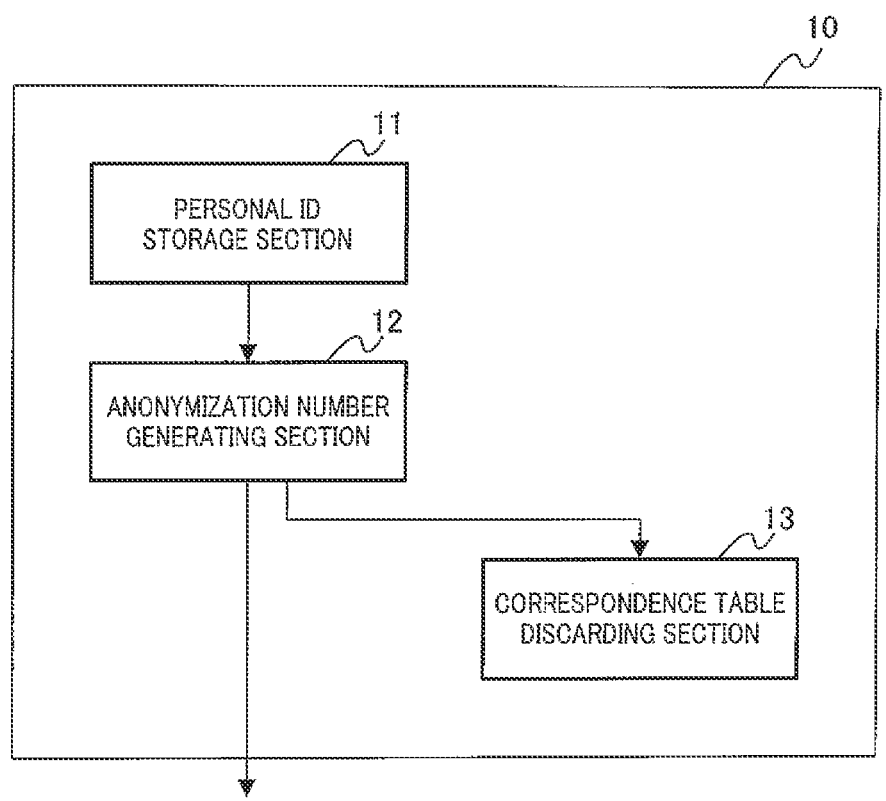
FIG. 1 is a block diagram showing an example of a configuration of a conventional anonymized information sharing apparatus.
Figure 2:
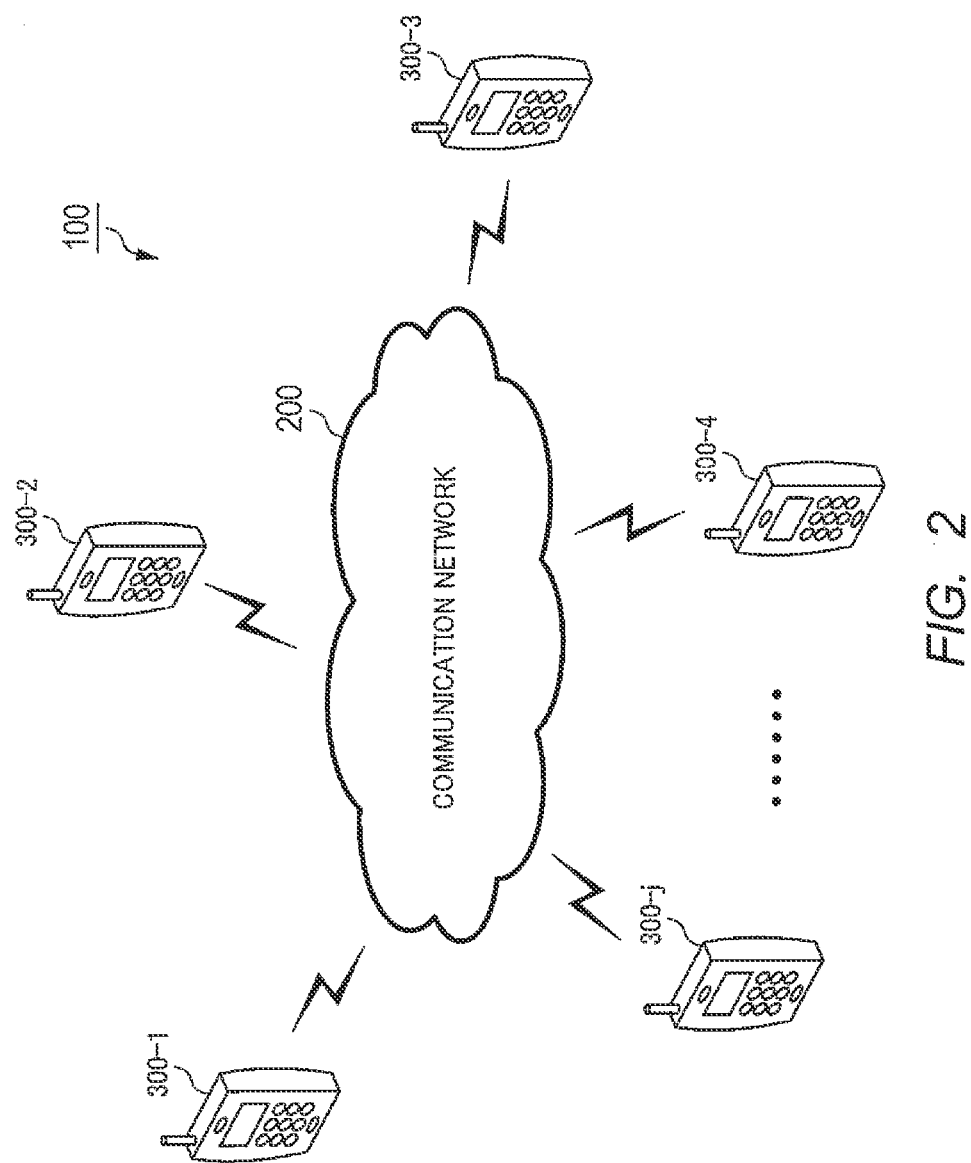
FIG. 2 shows an example of a configuration of an anonymized information sharing system including an anonymized information sharing apparatus according to Embodiment 1.

FIG. 2 shows one example of a configuration of an anonymized information sharing system including an anonymized information sharing apparatus according to Embodiment 1 of the claimed invention.

In FIG. 2, anonymized information sharing system 100 includes first to j-th anonymized information sharing apparatuses 300-1 to **300-*j* that communicate with each other by radio in communication network 200. First to j-th anonymized information sharing apparatuses 300-1 to 300-*j* transmit anonymized information to one another for sharing without using, for example, a central management server. That is, anonymized information sharing system 100** is a system for sharing anonymized information in a decentralized management network.

First to j-th anonymized information sharing apparatuses 300-1 to **300-*j* have a single configuration, and are collectively referred to as "anonymized information sharing apparatus 300" as deemed appropriate. Furthermore, in the present embodiment, anonymized information sharing apparatus 300 that has sent a certain piece of anonymized information (i.e., sender) is called anonymized information sharing apparatus 300*s*, and anonymized information sharing apparatus 300 that has received the certain piece of anonymized information (i.e., receiver) is called anonymized information sharing apparatus 300*r***.

Figure 3:
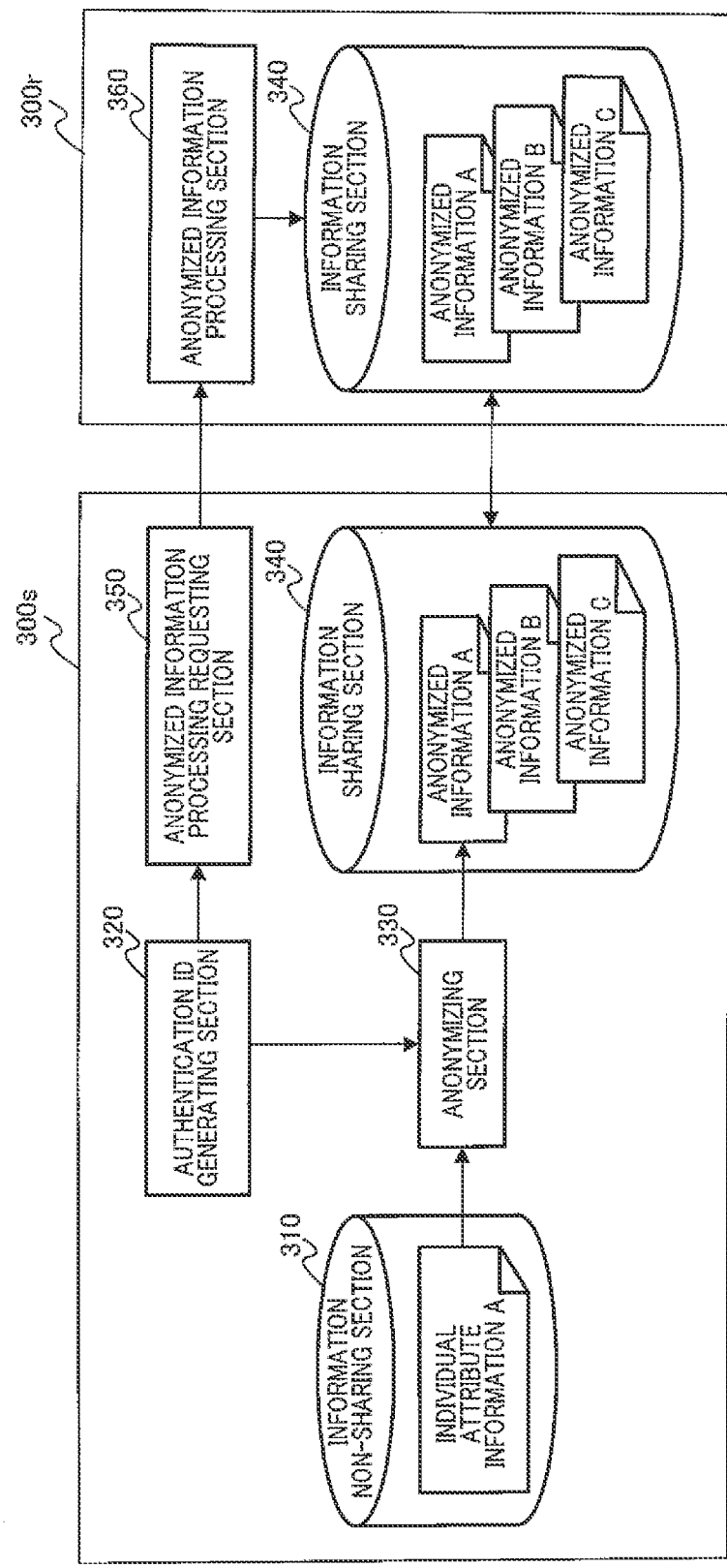
FIG. 3 is a block diagram showing a configuration of an anonymized information sharing apparatus according to Embodiment 1.

FIG. 3 is a block diagram showing a configuration of anonymized information sharing apparatus 300. In this figure, functional sections used for sending (outputting) anonymized information and functional sections used for receiving (inputting) the anonymized information are separately shown.

As shown in FIG. 3, anonymized information sharing apparatus **300*s*, a sender of anonymized information, includes information non-sharing section 310, authentication ID generating section 320, anonymizing section 330, information sharing section 340, and anonymized information processing requesting section 350. On the other hand, anonymized information sharing apparatus 300*r*, a receiver of the anonymized information, includes above-described information sharing section 340 and anonymized information processing section 360**.

Information non-sharing section 310 stores data having time information and position information added to its main data, which is to be shared (i.e., information to be shared, hereinafter referred to as "individual attribute information").

The time information and position information are, for example, Japan Standard Time and the latitude and longitude of a current position, respectively, both of which are acquired from a global positioning system (GPS) signal. The main data is, for example, a text inputted by a user, biological signal information such as pulse and blood pressure that are monitored by a sensor, or information about the amount of activity including the number of steps and the intensity of activity.

Part or all of the information format of the main data is not limited to any particular one, and a format stipulated in Health Level Seven (HL7), the guidelines of Continua Alliance, or Digital Imaging and Communication (DICOM) may be used, for example. Furthermore, the main data may include part or all of information described by these formats.

HL7 is the standard regulation for exchange of medical information, and involves exchange of information such as patient management, ordering, inquiry, financial affairs, laboratory report, master file, information management, reservation, patient introduction, patient care, laboratory automation, application management, and human resource management.

Continua Alliance is a group that develops guidelines for mutual connection of systems mainly in the following three areas: preventive health management (health and wellness), chronic disease management (disease management), independent lives of seniors (aging independently), and performs connectivity verification and logo authentication using actual devices.

DICOM is the standard for defining a format of images for medical applications developed by American College of Radiology (ACR) and National Electric Manufacturers Association (NEMA) and defining a communication protocol between medical imaging devices that operate such images. That is, DICOM is developed for operating images for medical applications that are photographed by computed tomography (CT), magnetic resonance imaging (MRI), or computed ragiography (CR).

Furthermore, the main data may be information provided by health information recording services, such as Google Health and Microsoft Health Vault. Furthermore, the main data may be information acquired from link information referred to information of a health information recording service and/or information obtained via an application program interface (API) of the health information recording service.

Authentication ID generating section 320 applies a hash function, which is a uni-directional function, to the combination of part or all of individual attribute information, a deletion password, and a data ID, for each individual attribute information, to generate an authentication ID. Then, authentication ID generating section 320 outputs the generated authentication ID to anonymizing section 330, and outputs the authentication ID and the deletion password used for generation of the authentication ID to anonymized information processing requesting section 350.

Anonymizing section 330 acquires individual attribute information stored in information non-sharing section 310 and adds the authentication ID received from authentication ID generating section 320 to the individual attribute information to generate anonymized information. Then, anonymizing section 330 outputs the generated anonymized information to information sharing section 340.

Information sharing section 340 of anonymized information sharing apparatus **300*s***, which is the sender of the anonymized information, transmits the anonymized information received from anonymizing section 330 to information sharing section 340 of anonymized information sharing apparatus 300r, which is the receiver of the anonymized information. Furthermore, information sharing section 340 of anonymized information sharing apparatus 300r, which is the receiver of the anonymized information, receives and holds the anonymized information transmitted from the anonymized information sharing apparatus 300s.

That is, information sharing section 340 uses, for example, an arbitrary peer-to-peer (P2P) protocol to share anonymized information with information sharing sections 340 of another anonymized information sharing apparatus 300.

Anonymized information processing requesting section 350 transmits a deletion request message containing the deletion password corresponding to the authentication ID, which is received from authentication ID generating section 320, to anonymized information sharing apparatus 300r if the individual attribute information corresponding to the authentication ID needs to be deleted.

The deletion request message requests anonymized information sharing apparatus 300r, which receives the deletion request message, to delete the anonymized information held in its information sharing section 340. More specifically, if there is a specific piece of anonymized information having an authentication ID which is equal to the result obtained by applying the hash function to part or all of the specific piece of anonymized information and the deletion password, the deletion request message requests deletion of the specific piece of anonymized information.

Here, the deletion request message designates data ID and part of individual attribute information as the part or all of the specific piece of anonymized information. Furthermore, the arrangement of information and the like for application of the hash function is determined in advance.

Anonymized information processing section 360 of anonymized information sharing apparatus 300r, which is the receiver of the anonymized information, receives the deletion request message sent from anonymized information sharing apparatus 300s, which is the sender of the anonymized information. Anonymized information processing section 360 compares the result obtained by applying the hash function to the combination of part or all of anonymized information held in its information sharing section 340 and the deletion password included in the deletion request message, with the authentication ID of anonymized information held in information sharing section 340. Then, if there is a specific piece of anonymized information having an authentication ID which is equal to the result obtained by the hash function process, anonymized information processing section 360 deletes the specific piece of anonymized information.

Anonymized information processing section 360 includes, for example, a central processing unit (CPU), a storage medium such as a random access memory (RAM), an operation section composed of a plurality of key switches or the like, a display section composed of a crystal liquid display or the like, and a radio communication circuit, all of which are not shown. In this case, the above-described functional sections are achieved by execution of a control program by the CPU.

Anonymized information sharing apparatus 300 having such a configuration can generate anonymized information from individual attribute information, and share the generated anonymized information with another anonymized information sharing apparatus 300.

Furthermore, anonymized information sharing apparatus 300 can generate anonymized information by adding an authentication ID generated by applying a hash function to the combination of part of the individual attribute information, the deletion password, and data ID, to each piece of individual attribute information to be shared.

Furthermore, anonymized information sharing apparatus 300 can delete anonymized information sent from itself by transmitting a deletion request message containing a deletion password used to verify that the deletion request message is an authorized deletion request message for the anonymized information.

Then, if the result obtained by applying the hash function to the combination of part or all of the anonymized information held inside and the deletion password included in the deletion request message is equal to the authentication ID of the anonymized information, anonymized information sharing apparatus 300 can delete the applicable anonymized information in accordance with the deletion request message.

Furthermore, anonymized information sharing apparatus 300 can delete anonymized information without identifying individual information or making the individual information publicly available.

Thus, anonymized information sharing apparatus 300 of the present embodiment enables anonymized information to be shared in a decentralized network, and enables only a sender can delete the anonymized information that has been once shared, while maintaining the anonymized status of the sender of the anonymized information.

Next, the overview of the processes from sharing to deletion of anonymized information performed in anonymized information sharing apparatus 300 will be described.

Figure 4:
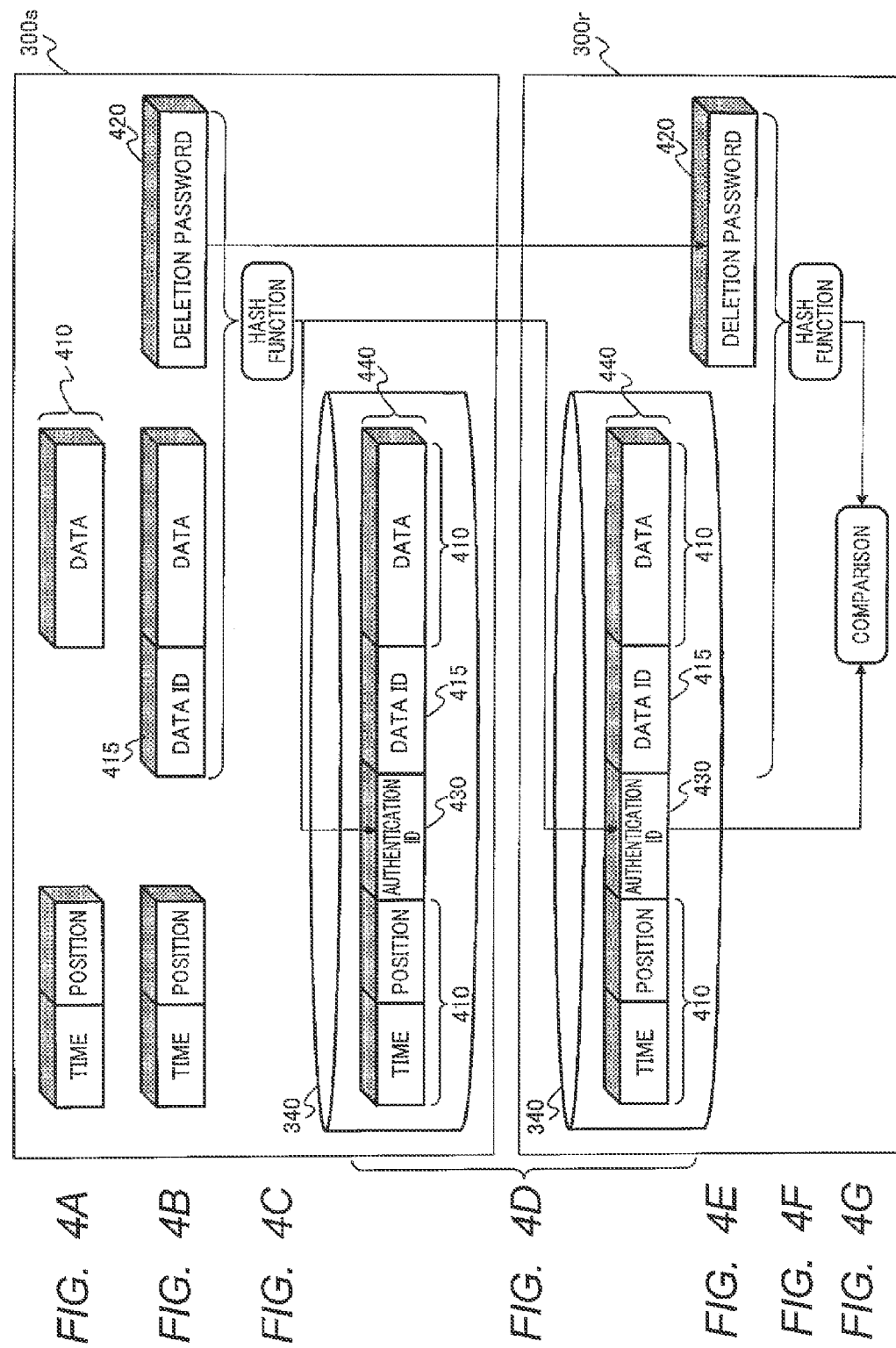
FIG. 4 is a schematic diagram showing an overview of processes according to Embodiment 1.

FIG. 4 is a schematic diagram showing the overview of the processes from sharing to deletion of anonymized information.

First, as shown in FIG. 4A, a certain anonymized information sharing apparatus 300s transfers individual attribute information 410 from information non-sharing section 310 to anonymizing section 330.

Next, as shown in FIG. 48, anonymized information sharing apparatus 300s transfers deletion password 420 from authentication ID generating section 320 to anonymizing section 330.

Then, as shown in FIG. 4C, anonymized information sharing apparatus 300s applies the hash function to the combination of part of individual attribute information 410, data ID 415, and deletion password 420 to generate authentication ID 430.

Then, as shown in FIG. 4D, anonymized information sharing apparatus 300s holds anonymized information 440 obtained by incorporating authentication ID 430 into individual attribute information 410 in its information sharing section 340, and transmits the anonymized information 440 to anonymized information sharing apparatus 300r. Accordingly, information sharing section 340 of anonymized information sharing apparatus 300s and information sharing section 340 of anonymized information sharing apparatus 300r can hold and share the same anonymized information 440.

Then, as shown in FIG. 4E, upon receiving an instruction for deleting anonymized information 440 from a user or the like, anonymized information sharing apparatus 300s, which is the sender of the anonymized information, transmits a deletion request message containing deletion password 420 to anonymized information sharing apparatus 300r.

Then, as shown in FIG. 4F, anonymized information sharing apparatus 300r allows anonymized information processing section 360 to apply the hash function to the combination of part or all of anonymized information (here, part of individual attribute information 410 and data ID 415), which is held in information sharing section 340, and deletion password 420.

Then, as shown in FIG. 4G, anonymized information sharing apparatus 300r compares the result of the hash function process with authentication ID 430 incorporated into anonymized information 440, and if the result of the hash function process is equal to authentication ID 430, anonymized information sharing apparatus 300r deletes anonymized information 440.

All anonymized information sharing apparatuses 300 in anonymized information sharing system 100 use the same hash function. Furthermore, all anonymized information sharing apparatuses 300 in anonymized information sharing system 100 can extract authentication ID 430 from anonymized information 440 and can extract deletion password 420 from a deletion request message. Hence, in anonymized information sharing system 100, anonymized information sharing apparatus 300s, which is the sender of the anonymized information, can delete anonymized information 440 by transmitting a deletion request message.

Furthermore, because authentication ID 430 is generated by the hash function, which is a uni-directional function, a third party cannot identify the original deletion password from authentication ID 430. Thus, even when knowing authentication ID 430 of the anonymized information 440, apparatuses other than the sender of the shared anonymized information 440 cannot perform spoofing to delete the anonymized information 440 by transmitting a deletion request message for deleting the anonymized information 440.

Next, the operation of anonymized information sharing apparatus 300 will be explained.

Figure 5:
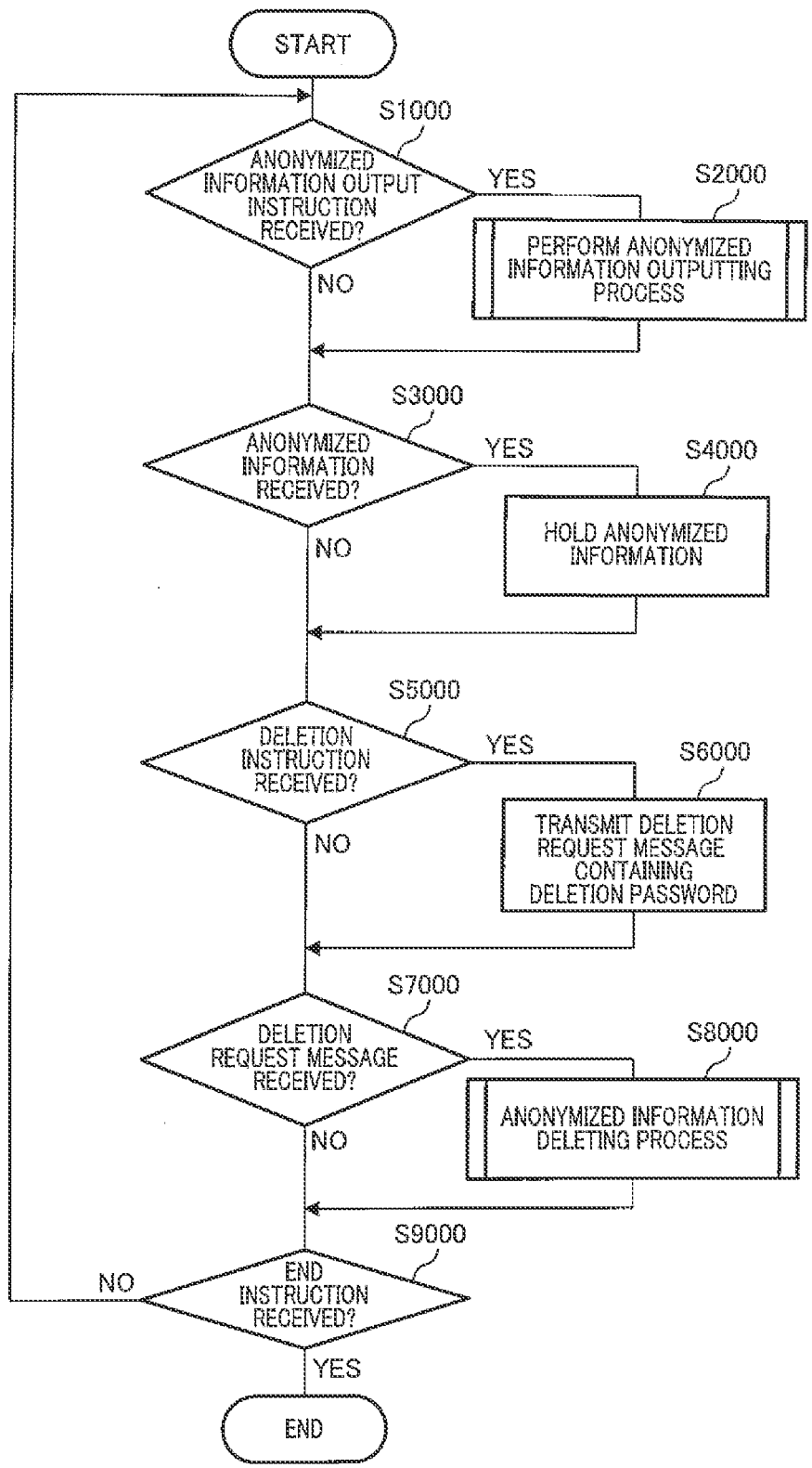
FIG. 5 is a flowchart of an operation of an anonymized information sharing apparatus according to Embodiment 1.

FIG. 5 is a flowchart of the operation of anonymized information sharing apparatus 300.

First, in step S1000, anonymizing section 330 determines whether the apparatus has received an instruction to output anonymized information. This instruction may be performed through a user operation, for example. If anonymizing section 330 determines that the apparatus has received the instruction to output anonymized information (S1000: YES), the process proceeds to step S2000. Furthermore, if anonymizing section 330 determines that the apparatus has not received the instruction to output anonymized information (S1000: NO), the process directly proceeds to step S3000.

In step S2000, anonymized information sharing apparatus 300s performs an anonymized information outputting process and proceeds to step S3000. The anonymized information outputting process is a process of generating anonymized information and outputting the generated anonymized information to anonymized information sharing apparatus 300r for sharing.

Figure 6:
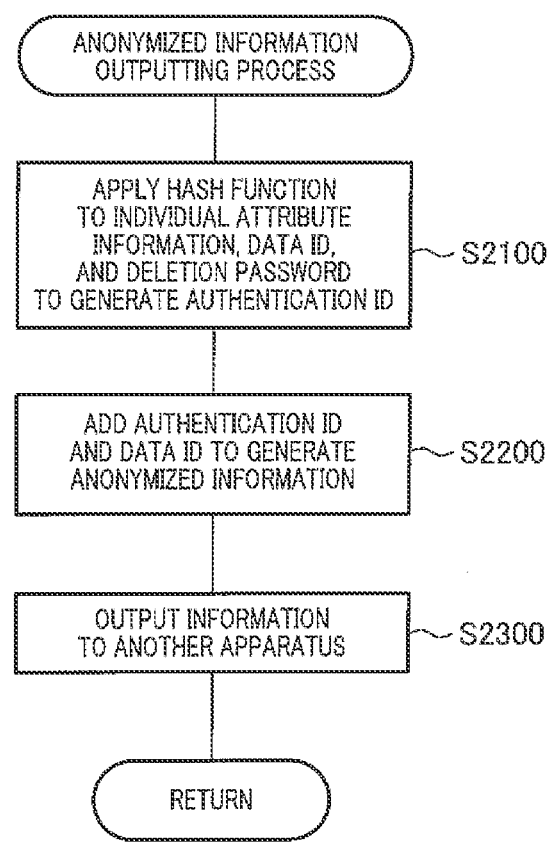
FIG. 6 is a flowchart of an anonymized information outputting process according to Embodiment 1.

FIG. 6 is a flowchart of the anonymized information outputting process.

First, in step S2100, authentication ID generating section 320 applies the hash function to part of individual attribute information, a deletion password provided in advance, and a data ID added to each data corresponding to anonymized information, to generate authentication ID. The deletion password preferably varies for each piece of individual attribute information: for example, a text acquired by adding an eight-digit random number to the year, month, date, day, minute, and second at which the individual attribute information is registered may be used as the deletion password. Furthermore, authentication ID generating section 320 outputs the generated authentication ID to anonymizing section 330. These processes may be performed prior to the process of step S1000 in FIG. 5.

Then, in step S2200, anonymizing section 330 acquires the individual attribute information from information non-sharing section 310. Then, anonymizing section 330 adds the authentication ID received from authentication ID generating section 320 and the data ID to the acquired individual attribute information to generate anonymized information. The data ID preferably varies for each piece of individual attribute information: for example, a text acquired by adding a three-digit random number to the year, month, date, day, minute, and second at which the individual attribute information is registered may be used as the deletion password. These processes may be performed prior to the process of step S1000 in FIG. 5. Then, anonymizing section 330 outputs the generated anonymized information to information sharing section 340.

Then, in step S2300, information sharing section 340 outputs (sends) the anonymized information newly received from anonymizing section 330 to anonymized information sharing apparatus 300r, and returns to the process illustrated in FIG. 5. As a result, the anonymized information is shared between anonymized information sharing section 340 of anonymized information sharing apparatus 300s and anonymized information sharing section 340 of anonymized information sharing apparatus 300r by the process illustrated in step S4000 (described hereinafter) in the anonymized information sharing apparatus 300r.

In step S3000 illustrated in FIG. 5, information sharing section 340 determines whether the apparatus has received the anonymized information from anonymized information sharing apparatus 300s. If information sharing section 340 determines that the apparatus has received the anonymized information (S3000: YES), the process proceeds to step S4000. If information sharing section 340 determines that the apparatus has not received the anonymized information (S3000: NO), the process directly proceeds to step S5000.

In step S4000, information sharing section 340 holds the received anonymized information, and the process proceeds to step S5000.

In step S5000, anonymized information processing requesting section 350 determines whether the apparatus has received an instruction to delete the shared anonymized information. This instruction may be performed through a user operation, for example. If anonymized information processing requesting section 350 determines that the apparatus has received the instruction to delete the shared anonymized information (S5000: YES), the process proceeds to step S6000. If anonymized information processing requesting section 350 determines that the apparatus has not received the instruction to delete the shared anonymized information (S5000: NO), the process directly proceeds to step S7000.

In step S6000, anonymized information processing requesting section 350 transmits a deletion request message containing the deletion password to anonymized information sharing apparatus 300r, and the process proceeds to step 37000.

In step 37000, anonymized information processing section 360 determines whether the apparatus has received a deletion request message from anonymized information sharing apparatus 300s, if anonymized information processing section 360 determines that the apparatus has received the deletion request message (S7000: YES), the process proceeds to step S8000. If anonymized information processing section 360 determines that the apparatus has not received the deletion request message (S7000: NO), the process directly proceeds to step S9000.

In step S8000, anonymized information sharing apparatus 300r performs an anonymized information deleting process. The anonymized information deleting process is a process of appropriately deleting the anonymized information held in its information sharing section 340 in response to the deletion request message.

Figure 7:
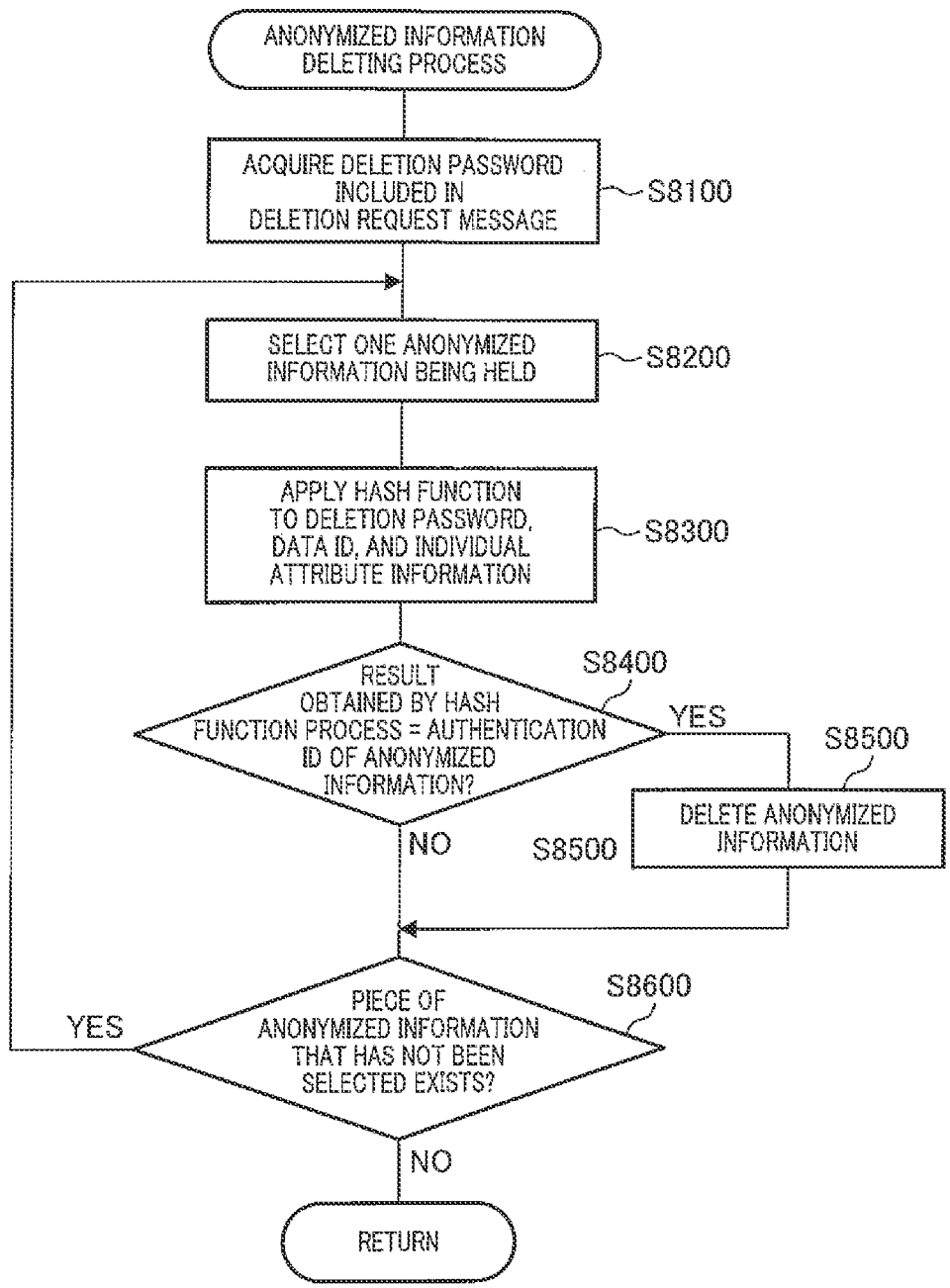
FIG. 7 is a flowchart of an anonymized information deleting process according to Embodiment 1.

FIG. 7 is a flowchart of the anonymized information deleting process.

First, in step 38100, anonymized information processing section 360 acquires the deletion password included in the received deletion request message.

Then, in step S8200, anonymized information processing section 360 selects one of the pieces of anonymized information held in information sharing section 340.

Then, in step S8300, anonymized information processing section 360 applies the hash function to the combination of the acquired deletion password, the data ID included in the anonymized information being selected, and the individual attribute information included in the anonymized information being selected.

In step S8400, anonymized information processing section 360 determines whether the result obtained by the hash function process is equal to the authentication ID of the anonymized information being selected. If anonymized information processing section 360 determines that the result obtained by the hash function process is equal to the authentication ID (S8400: YES), the process proceeds to step S8500. If anonymized information processing section 360 determines that the result obtained by the hash function process is not equal to the authentication ID (S8400: NO), the process proceeds to step S8600.

In step S8500, anonymized information processing section 360 deletes the anonymized information being selected from information sharing section 340, and the process proceeds to step S8600. As a result, if the deletion request message received from the sender of the anonymized information, the anonymized information is deleted in accordance with the deletion request message.

In step S8600, anonymized information processing section 360 determines whether there are any pieces of anonymized information that have not been selected from among all pieces of the anonymized information held in information sharing section 340. If anonymized information processing section 360 determines that there are some pieces of anonymized information that have not been selected (S8600: YES), the process returns to step S8200 to select any of the pieces of anonymized information that have not been selected, and the process is repeated. If anonymized information processing section 360 determines that there is no piece of anonymized information that has not been selected (S8600: NO), the process returns to the process of FIG. 5. As a result, anonymized information sharing apparatus 300s can allow anonymized information sharing apparatus 300r to delete the anonymized information that has been sent by the anonymized information sharing apparatus 300s even when anonymized information sharing apparatus 300r holds a plurality of pieces of anonymized information.

According to the present embodiment, the hash function is applied to a deletion password and a data ID included in anonymized information for each piece of anonymized information held in information sharing section 340, and determines whether the result obtained by the hash function process is equal to the authentication ID included in the identical anonymized information.

Which part of anonymized information is used for the above determination process is not limited to the above example. For example, part of anonymized information to be used for the determination process may be designated by transmitting a deletion password containing a pair of a deletion password and a data ID to make a deletion request message. In this case, anonymized information sharing apparatus 300r that has received the anonymized information can first narrow down pieces of anonymized information based on the data ID and then perform the hash function process, which reduces the process load and time significantly.

In step S9000, anonymized information sharing apparatus 300 determines whether it has received an instruction to end the process. This instruction may be performed through a user operation, for example. If anonymized information sharing apparatus 300 has not received the instruction to end the process (S9000: NO), the process returns to step S1000. If anonymized information sharing apparatus 300s has received the instruction to end the process (S9000: YES), the process ends a series of the processes.

In this way, anonymized information sharing apparatus 300 according to the present embodiment applies the hash function to the combination of a deletion password included in the deletion request message, a data ID included in anonymized information, and part of individual attribute information included in the anonymized information. Then, if the result of the hash function process is equal to the authentication ID of the anonymized information, anonymized information sharing apparatus 300 causes another anonymized information sharing apparatus to delete the anonymized information. With this configuration, only the apparatus that has sent the anonymized information can maintain the anonymized status of the anonymized information and allow anonymized information sharing apparatus 300r to perform a predetermined process on the anonymized information. That is, anonymized information sharing apparatus 300 according to the present embodiment can allow the sender of the anonymized information to continuously manage the anonymized information shared in a decentralized management network.

Furthermore, upon receiving a deletion password, anonymized information sharing apparatus 300 performs the above steps and transfers the received deletion password to some or all of the anonymized information sharing apparatuses with which anonymized information sharing apparatus 300 shares anonymized information. This makes it difficult for other apparatuses to find out which apparatus has transmitted the deletion request message.

Embodiment 2

Figure 8:
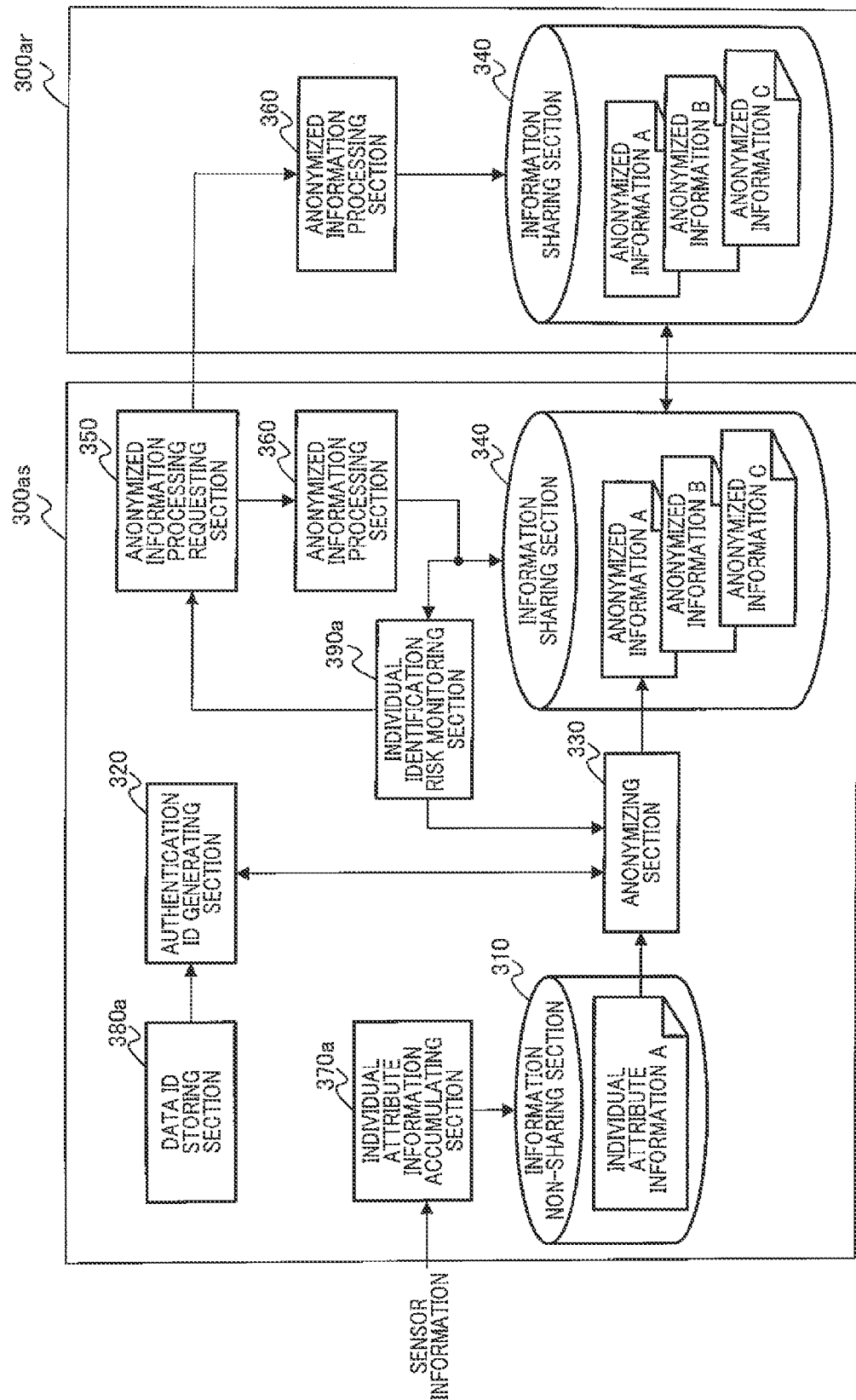
FIG. 8 is a block diagram showing a configuration of an anonymized information sharing apparatus according to Embodiment 2.

FIG. 8 is a block diagram showing a configuration of an anonymized information sharing apparatus according to Embodiment 2 of the claimed invention, and corresponds to FIG. 3 of Embodiment 1. Components in FIG. 8 that are the same as components in FIG. 3 will be assigned the same reference numerals as in FIG. 3 and duplicate explanations will be omitted. Furthermore, hereinafter, anonymized information sharing apparatus 300a that has sent a specific piece of anonymized information (i.e., sender) is called anonymized information sharing apparatus 300as, and anonymized information sharing apparatus 300a that has received the specific piece of anonymized information (i.e., receiver) is called anonymized information sharing apparatus 300ar.

In FIG. 8, the functional sections of anonymized information sharing apparatus 300as, which is a sender of anonymized information, includes individual attribute information accumulating section 370a, data ID storing section 380a, and individual identification risk monitoring section 390a in addition to the functional sections of the FIG. 3.

Individual attribute information accumulating section 370a acquires sensor information such as the latitude and longitude information of the current position of a user to generate individual attribute information, and records the generated individual attribute information in information non-sharing section 310.

Data ID storing section 380a stores in advance an individual password arbitrarily determined by a user. Furthermore, data ID storing section 380a holds a data ID used for identifying pieces of information in anonymized information sharing apparatus 300as.

In the present embodiment, the data ID is part of key information used for generating a one-time password, and is public key information and is used to verify the authority of operation of individual attribute information. The data ID varies for each piece of individual attribute information. The data ID is created in any ID system using an arbitrary method or a same method for each anonymized information sharing apparatus when, for example, individual attribute information is generated. The data ID is then stored in data ID storing section 380a.

According to the present embodiment, anonymizing section 330 generates anonymized information by converting (anonymizing) the authentication ID into information with which its anonymized status can easily be maintained.

Specifically, in the present embodiment, authentication ID generating section 320 applies the hash function to the combination of the data ID and the individual password to generate a deletion password. Then, authentication ID generating section 320 applies the hash function to the combination of the generated deletion password, a data ID, and part or all of individual attribute information, to generate an authentication ID, as with Embodiment 1. The deletion password also varies as well as the authentication ID for each piece of anonymized information.

Furthermore, in the present embodiment, anonymized information processing requesting section 350 generates the deletion password through the same process as that of authentication IL) generating section 320.

Individual identification risk monitoring section 390a monitors the individual identification risk of anonymized information sharing apparatus 300as based on the anonymized information held in information sharing section 340. Here, the individual identification risk refers to the scale of the risk that an individual or anonymized information sharing apparatus 300as associated with the individual is identified, the anonymized information sharing apparatus 300as being the sender of anonymized information. If the individual identification risk is high, individual identification risk monitoring section 390a instructs anonymized information processing requesting section 350 to delete the anonymized information indicating the high individual identification risk.

The simplest method of performing verification using the deletion password and the authentication ID is to use a value obtained by applying the hash function to an individual password as the authentication ID and use the individual password as the deletion password.

In this case, however, a single deletion password is used for all pieces of anonymized information. Thus, there is a risk that leakage of the deletion password causes arbitrary anonymized information of an individual to be deleted or falsified.

To prevent the above risk, a different deletion password is determined for each piece of anonymized information. In that case, however, a user needs to prepare and manage deletion passwords for all pieces of anonymized information, which is not practical.

On the other hand, anonymized information sharing apparatus 300a of the present embodiment applies the hash function to the combination of the data ID and the individual password to generate a unique deletion password, and thus does not require preparation for and management of a deletion password for each piece of data.

In this way, anonymized information sharing apparatus 300a can vary the deletion password and authentication ID for each piece of anonymized information. Accordingly, anonymized information sharing apparatus 300a can reduce a risk that an activity is traced by a third party based on the deletion password and authentication ID.

Furthermore, anonymized information sharing apparatus 300a can delete the anonymized information to reduce the individual identification risk if the individual identification risk is high. The situation in which the individual identification risk is high is, for example, a situation in which no apparatus was present at the position at which anonymized information sharing apparatus 300a was present at the same time, and, if anonymized information is left without any change, the anonymity of the sender of the anonymized information might be lost.

Next, the overview of the processes from sharing to deletion of anonymized information that are performed in anonymized information sharing apparatuses 300a will be described.

Figure 9:
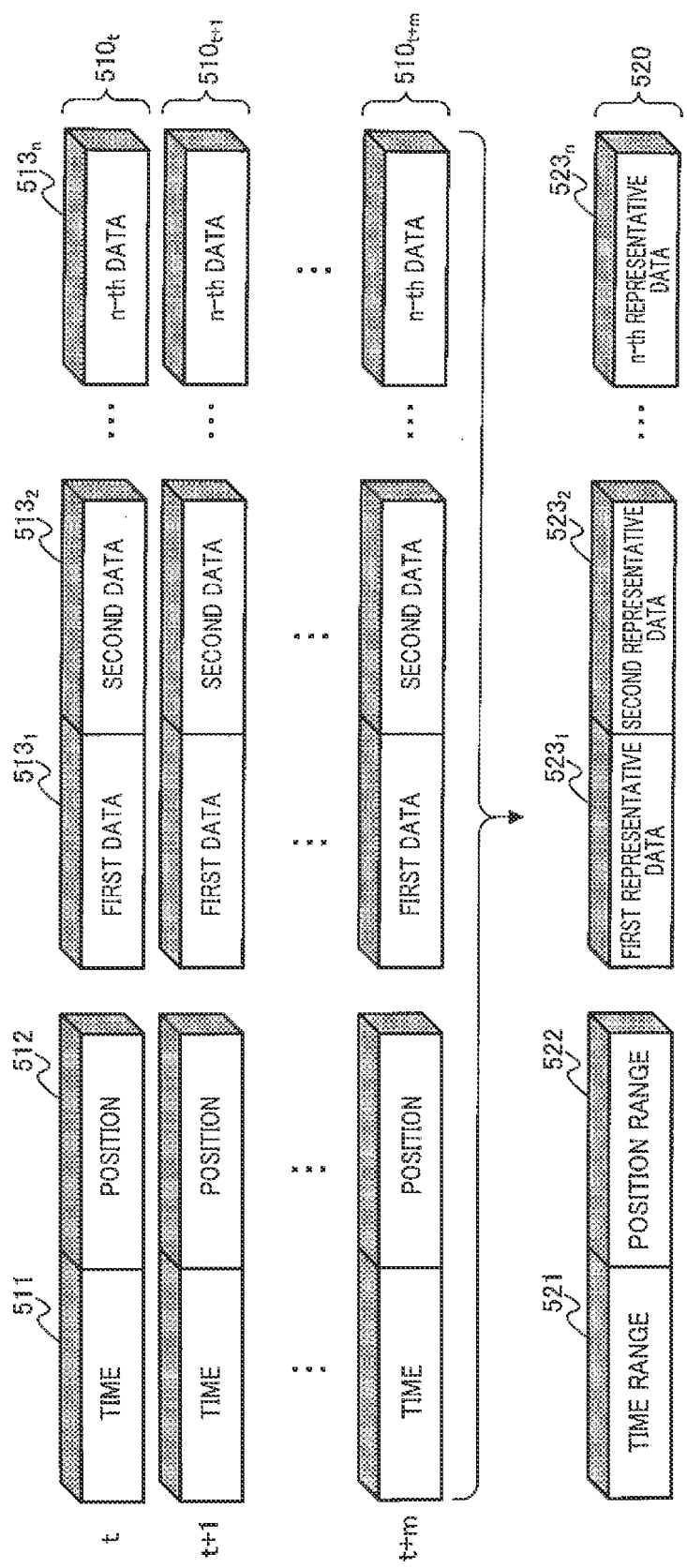
FIG. 9 is a schematic diagram of anonymization of individual attribute information according to Embodiment 2.

FIG. 9 is a schematic diagram of anonymization of individual attribute information in anonymizing section 330.

As shown in FIG. 9, anonymizing section 330 binds 1+m pieces of individual attribute information $510_t$ to $510_{t+m}$ that are generated from time t to time t+m, respectively, into a single piece of individual attribute information 520 from which it is difficult to identify the details of the original individual attribute information.

Specifically, anonymizing section 330 determines time range 521 as the representative value of pieces of time information 511 corresponding to pieces of individual attribute information $510_t$ to $510_{t+m}$.

Furthermore, anonymizing section 330 determines position range 522 as the representative value of position ranges 512 corresponding to pieces of individual attribute information $510_t$ to $510_{t+m}$.

Furthermore, anonymizing section 330 determines first to n-th pieces of representative data $523_1$ to $523_n$ as the respective representative values of first to n-th pieces of main data $513_1$ to $513_n$ corresponding to pieces of individual attribute information $510_t$ to $510_{t+m}$.

Time range 521 includes, for example, time t, time length d from time t to time t+m, and sampling interval s of pieces of individual attribute information $510_t$ to $510_{t+m}$.

Position range 522 includes, for example, the latitude and longitude information G of the center position of the distribution range of pieces of position information from time t to time t+m, and radius r from the center position of the distribution range.

Representative data 523 is, for example, main data at any time, a frequently appearing phrase or value, or an average value.

That is, anonymized information sharing apparatus 300a does not directly share information indicating individual's whereabouts at a certain time point, but shares aggregation information and statistical information in a certain spatial range and a certain time range. Such individual attribute information 520 can be information from which it is difficult to identify the sender (i.e., the anonymization level is high) compared to each piece of individual attribute information $510_t$ to $510_{t+m}$. Thus, the user can share anonymized information with another person while enjoying a useful service using the position information.

Figure 10:
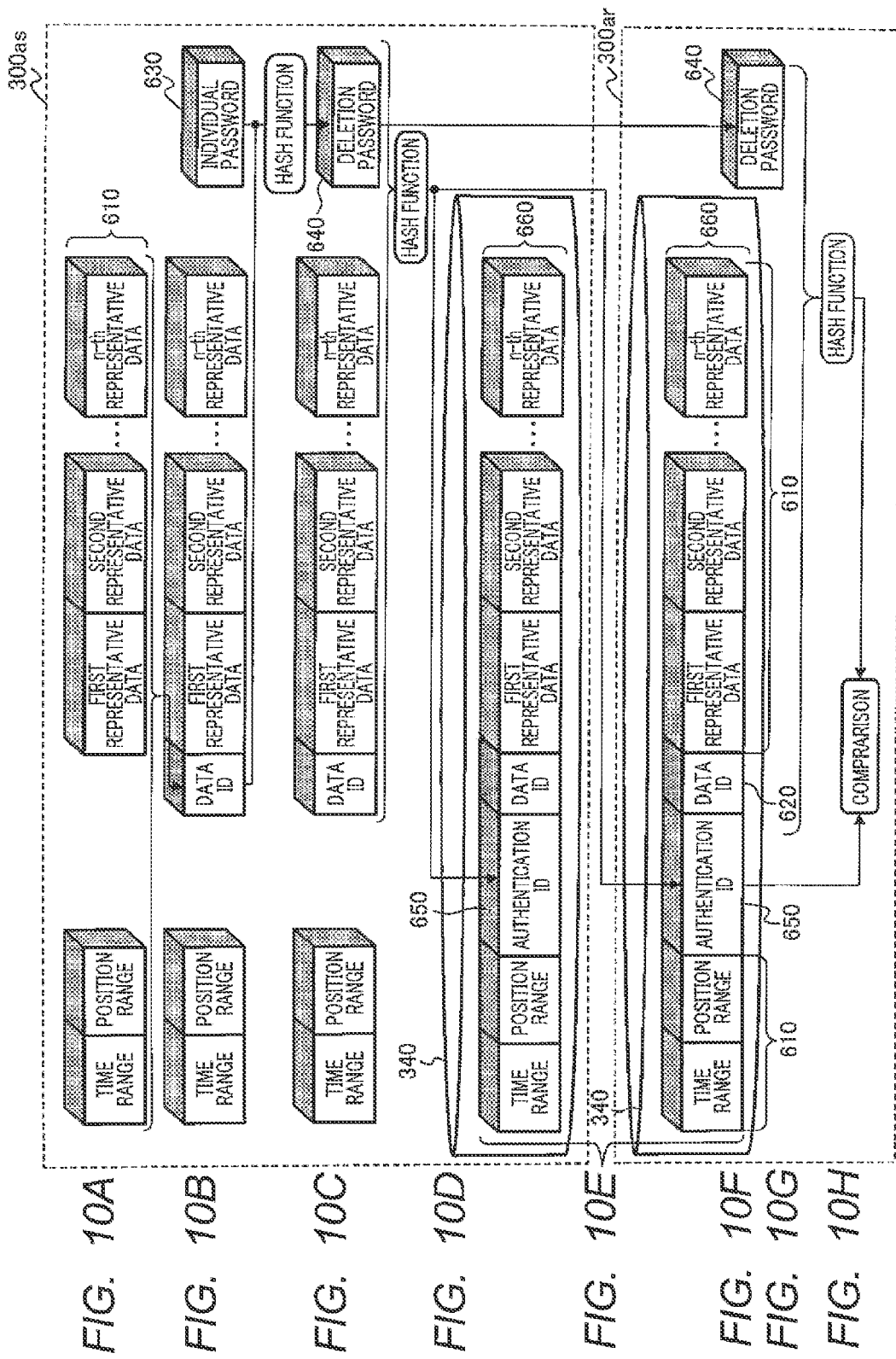
FIG. 10 is a schematic diagram of an overview of processes according to Embodiment 2.

FIG. 10 is a schematic diagram of an overview of the processes from sharing to deletion of anonymized information in the present embodiment, and corresponds to FIG. 4 of Embodiment 1.

First, as shown in FIG. 10A, a certain anonymized information sharing apparatus 300*as* generates individual attribute information 610 (which corresponds to individual attribute information 520 in FIG. 9).

Then, as shown in FIG. 10B, anonymized information sharing apparatus 300*as* determines data ID 620 of individual attribute information 610.

Then, as shown in FIG. 10C, anonymized information sharing apparatus 300*as* applies the hash function to the combination of individual password 630 determined in advance and data ID 620 to generate deletion password 640.

Then, as shown in FIG. 10D, anonymized information sharing apparatus 300*as* applies the hash function to the combination of data ID 620, part or all of individual attribute information 610 (i.e., representative data in FIG. 10D), and deletion password 640. Accordingly, anonymized information sharing apparatus 300*as* generates authentication ID 650.

Then, as shown in FIG. 10E, anonymized information sharing apparatus 300*as* transmits anonymized information 660 obtained by incorporating authentication ID 650 and data ID 620 into individual attribute information 610 to information sharing sections 340 of anonymized information sharing apparatus 300*ar*. In this manner, anonymized information 660 is shared.

Then, as shown in FIG. 10F, anonymized information sharing apparatus 300*as*, which is the sender of the anonymized information, allows individual identification risk monitoring section 390*a* or the like to give an instruction to delete shared anonymized information 660.

At this time, anonymized information sharing apparatus 300*as* generates deletion password 640 by the same procedure as that of FIGS. 10B and 10C. Then, anonymized information sharing apparatus 300*as* transmits deletion password 640 included in a deletion request message to anonymized information sharing apparatus 300*ar*.

Then, as shown in FIG. 10G, anonymized information sharing apparatus 300*ar* allows anonymized information processing section 360 to apply the hash function to the combination of part or all of individual attribute information 610 (i.e., representative data), deletion password 640, and data ID.

Then, as shown in FIG. 1014, anonymized information sharing apparatus 300*ar* compares the result of the hash function process with authentication ID 650 included in anonymized information 660, and if the result of the hash function process is equal to the authentication ID 650, anonymized information sharing apparatus 300*ar* deletes anonymized information 660.

All anonymized information sharing apparatuses 300*a* can use the same hash function to generate the authentication ID and deletion password. Furthermore, all anonymized information sharing apparatuses 300*a* can apply the hash function to the same part of anonymized information 660. Thus, as with Embodiment 1, each anonymized information sharing apparatus 300*as* can continuously manage the anonymized information sent for sharing by the anonymized information sharing apparatus 300*as*.

Furthermore, data ID varies for each individual attribute information 610. Furthermore, individual password 630 can be arbitrarily determined by a user. Thus, deletion password 640 generated by the hash function process is information from which it is very difficult to identify its sender.

Furthermore, the authentication ID generated as a result of application of the hash function to the combination of data ID, individual attribute information 610, and a deletion password can be information from which it is very difficult to identify its sender. That is, anonymized information sharing apparatus 300*a* can set pieces of information additionally transmitted and received for the management of anonymized information (hereinafter referred to as "additional information") in an anonymized status.

The operation of anonymized information sharing apparatus 300*a* will be explained.

Figure 11:
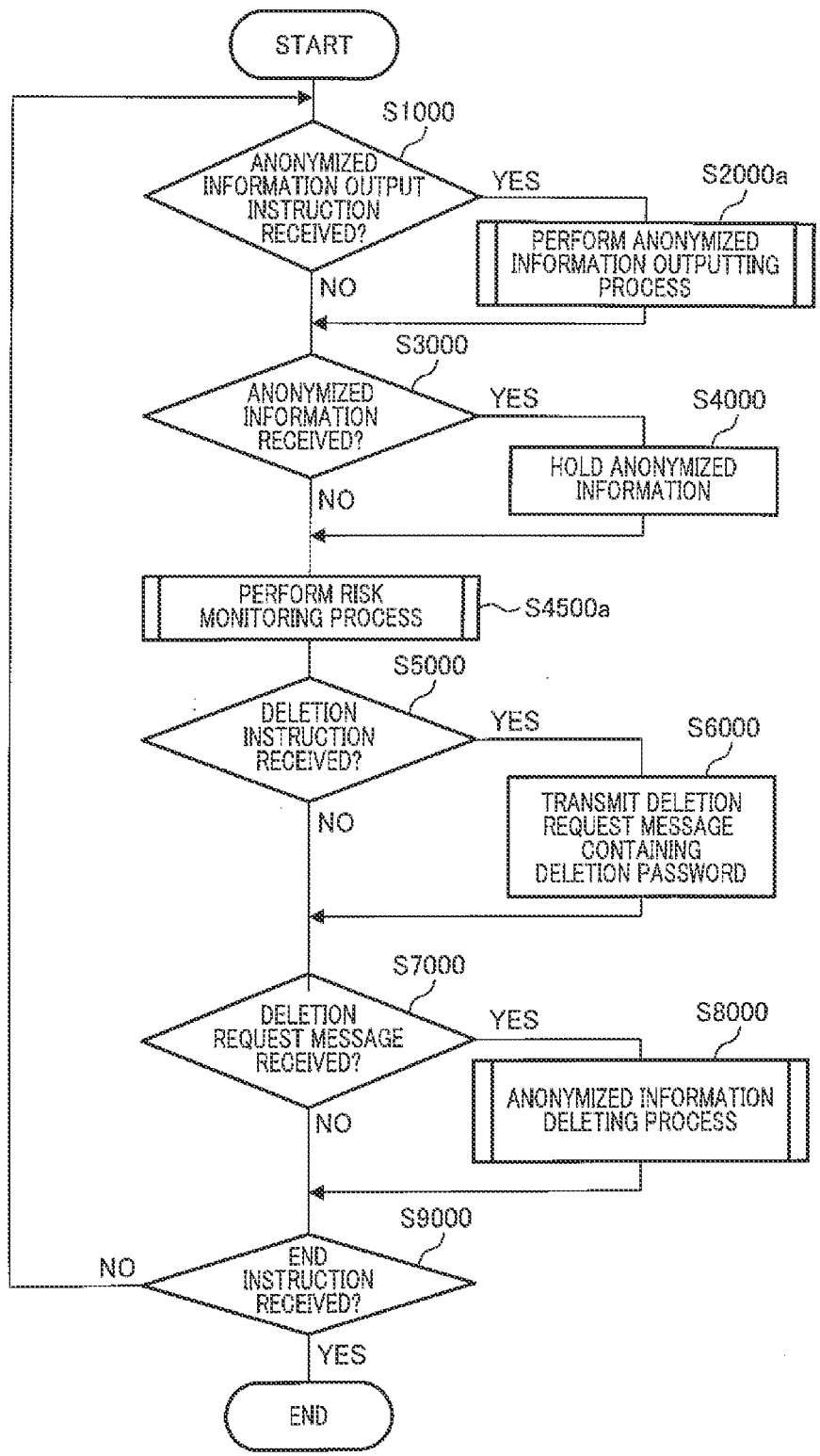
FIG. 11 is a flowchart of an operation of an anonymized information sharing apparatus according to Embodiment 2.

FIG. 11 is a flowchart of the operation of anonymized information sharing apparatus 300*a* according to the present embodiment, and corresponds to FIG. 5 of Embodiment 1. Components in FIG. 11 that are the same as components in FIG. 5 will be assigned the same reference numerals as those in FIG. 5 and duplicate explanations will be omitted.

If anonymized information sharing apparatus 300*as* has received an instruction to output anonymized information, through a user operation, for example (S1000: YES), anonymized information sharing apparatus 300*as* performs an anonymized information outputting process, which is different from that of Embodiment 1, in step S2000*a*.

Figure 12:
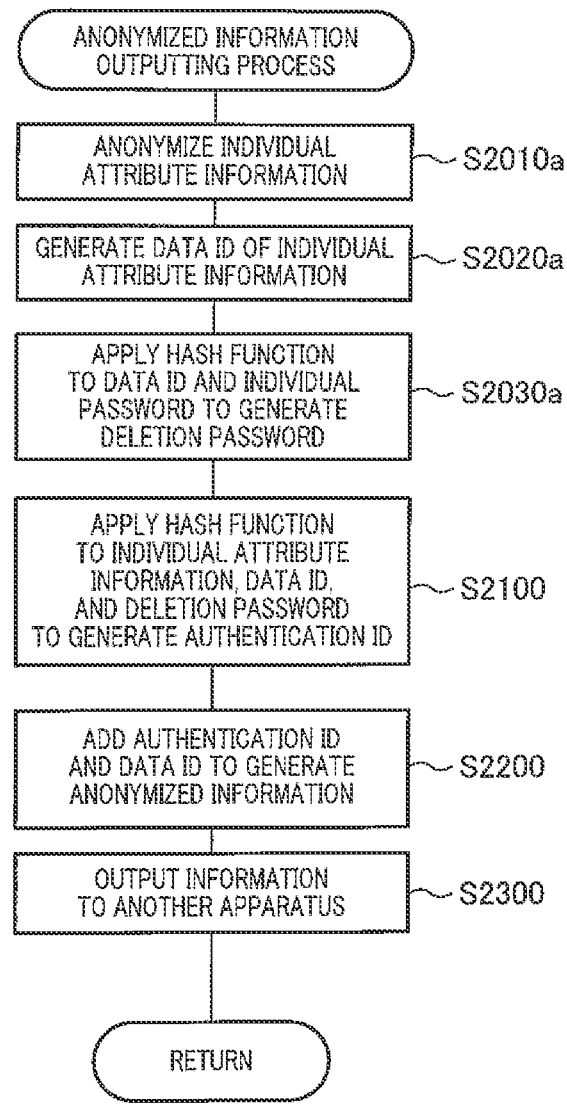
FIG. 12 is a flowchart of an anonymized information outputting process according to Embodiment 2.

FIG. 12 is a flowchart of the anonymized information outputting process according to the present embodiment, and corresponds to FIG. 6 of Embodiment 1. Steps in FIG. 12 that are the same as steps in FIG. 6 will be assigned the same step numbers as those in FIG. 6 and duplicate explanations will be omitted.

First, in step S2010*a*, anonymizing section 330 acquires and anonymizes individual attribute information subject to the instruction to output anonymized information. That is, if 1+m pieces of individual attribute information $510_t$ to $510_{t+m}$ that are generated from time t to time t+m are the targets of output, anonymizing section 330 allows a single piece of individual attribute information 520 to represent the 1+m pieces of individual attribute information $510_t$ to $510_{t+m}$, as explained with reference to FIG. 9.

Then, in step S2020*a*, data ID storing section 380*a* generates data ID of the individual attribute information anonymized in anonymizing section 330. Then, data ID storing section 380*a* outputs the generated data. ID and the individual password determined in advance to authentication ID generating section 320.

Then, in step S2030*a*, authentication ID generating section 320 applies the hash function to the combination of the received data ID and individual password. Accordingly, authentication ID generating section 320 generates a deletion password. The processes after this process in the anonymized information outputting process are identical to those of Embodiment 1.

Furthermore, anonymized information sharing apparatus 300*as* performs a risk monitoring process as step S4500*a* before determining whether it has received the delete instruction (S5000 in FIG. 11). The risk monitoring process is a process of monitoring individual identification risks of all pieces of anonymized information held in process information sharing section 340 and allowing the piece of anonymized information having a high individual identification risk to be deleted.

Figure 13:
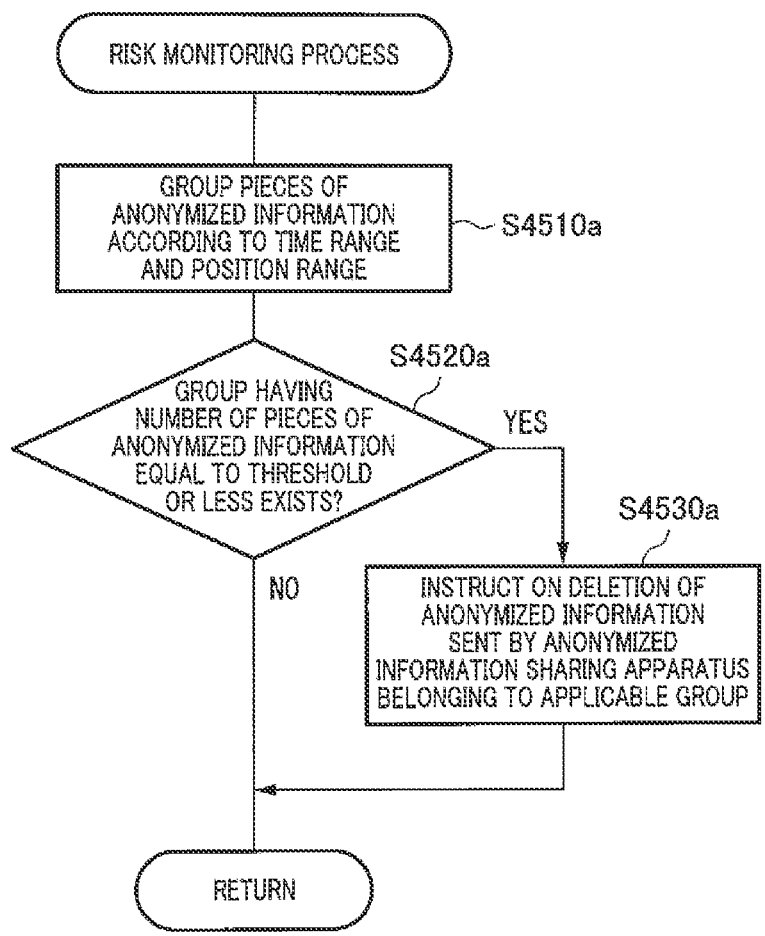
FIG. 13 is a flowchart of a risk monitoring process according to Embodiment 2.

FIG. 13 is a flowchart of a risk monitoring process.

First, in step S4510*a*, individual identification risk monitoring section 390*a* groups pieces of anonymized information held in information sharing section 340 based on the combination of the time range and the position range. Specifically, if there is a piece of anonymized information sent by another apparatus that includes the time range and position range that overlap those of a piece of anonymized information sent by the apparatus of the individual identification risk monitoring section 390a, individual identification risk monitoring section 390a groups applicable piece of anonymized information sent by the other apparatus and sent by the apparatus of the individual identification risk monitoring section 390a.

Then, in step S4520a, individual identification risk monitoring section 390a determines whether there is a group having the number of pieces of anonymized information that is equal to or smaller than threshold k. Threshold k is a value determined in advance according to the allowable individual identification risk. The threshold k is the largest parameter of a group having the possibility of a particular individual being identified among groups that meet the condition that the time range and the position range of the constituents of the group overlap those of a piece of anonymized information sent by the sender of the anonymized information.

If individual identification risk monitoring section 390a determines that there is an applicable group (S4520a: YES), the process proceeds to step S4530a. If individual identification risk monitoring section 390a determines that there is no applicable group (S4520a: NO), the process directly returns to the process of FIG. 11.

In step S4530a, individual identification risk monitoring section 390a instructs anonymized information processing requesting section 350 to delete a piece of anonymized information sent by that anonymized information sharing apparatus 390a in a group having the number of pieces of anonymized information that is equal to threshold k or smaller, and returns to the process of FIG. 11. As a result, when an individual identification risk of any of pieces of anonymized information of anonymized information sharing apparatus 300as is high, anonymized information sharing apparatus 300as can detect the piece of anonymized information having a high individual identification risk and give an instruction to delete the piece of anonymized information.

Furthermore, if having received the instruction to delete any of pieces of anonymized information (S5000: YES), anonymized information sharing apparatus 300as performs a deletion request message transmitting process as step S6000a. The deletion request message transmitting process is a process of transmitting a deletion request message requesting deletion of a piece of anonymized information that has been designated as a deletion target to anonymized information sharing apparatus 300ar.

For example, let us assume a case where, in the position range indicating a certain station, the number of pieces of anonymized information is 300 in the time range of one hour from 8 to 9 o'clock, which is a commuter rush hour, and the number of pieces of anonymized information is 10 in the time range of one hour from 12 to 13 o'clock.

In this case, the possibility of a certain individual being identified is low in the time range from 8 to 9 o'clock whereas the possibility of a certain individual being identified is high in the time range from 12 to 13 o'clock. In such a case, individual identification risk monitoring section 390a can set threshold k to 30, for example, so that if there is a group having the number of pieces of anonymized information that is smaller than 30, individual identification risk monitoring section 390a can delete the piece of anonymized information of the anonymized information sharing apparatus in the group.

Furthermore, after deletion of the piece of anonymized information, individual identification risk monitoring section 390a extends the position range based on the number of pieces of anonymized information recognized by the anonymized information sharing apparatus of the individual identification risk monitoring section 390a. Alternatively, individual identification risk monitoring section 390a may recreate pieces of anonymized information for sharing, by re-setting various conditions for creating anonymized information, such as extending the time range.

Furthermore, individual identification risk monitoring section 390a may be used for determining the position range and time range that lower the individual identification risk, before generating anonymized information.

Figure 14:
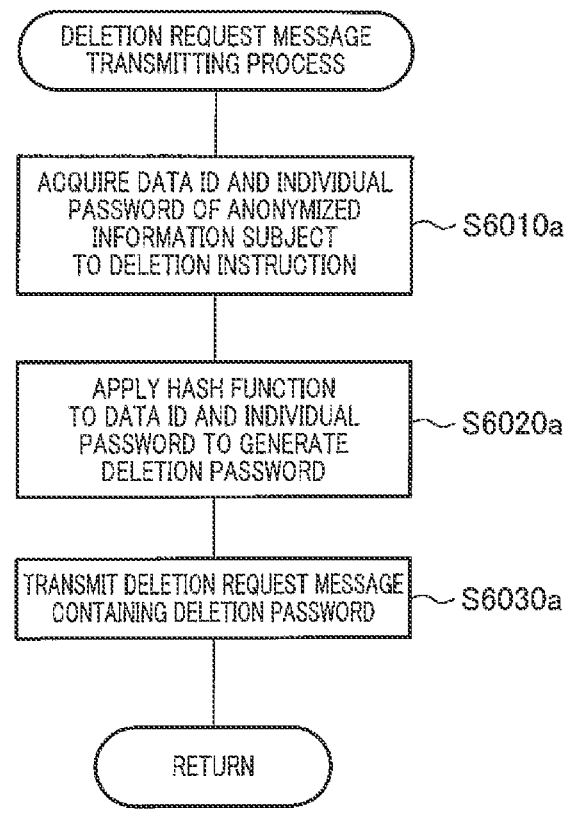
FIG. 14 is a flowchart of a deletion request message transmitting process according to Embodiment 2.

FIG. 14 is a flowchart of the deletion request message transmitting process according to the present embodiment.

First, in step S6010a, individual identification risk monitoring section 390a acquires data ID of anonymized information that has been designated as a deletion target. Then, individual identification risk monitoring section 390a outputs the acquired data ID and an individual password determined in advance to anonymized information processing requesting section 350.

Then, in step S6020a, anonymized information processing requesting section 350 applies the hash function to the combination of the received data ID and individual password. In this manner, anonymized information processing requesting section 350 generates a deletion password.

Then, in step S6030a, anonymized information processing requesting section 350 transmits the deletion request message containing the generated deletion password to anonymized information sharing apparatus 300ar, and the process returns to the process of FIG. 11. As a result, anonymized information sharing apparatus 300as can delete the anonymized information that has been designated as a deletion target, for example, by individual identification risk monitoring section 390a, from information sharing section 340 of anonymized information sharing apparatus 300ar.

Furthermore, anonymized information sharing apparatus 300ar according to the present embodiment performs an anonymized information deleting process, which is different from that of Embodiment 1, as step S8000a, if having received a deletion request message from anonymized information sharing apparatus 300as (S7000: YES).

In this way, anonymized information sharing apparatus 300a according to the present embodiment uses a result obtained by applying a unidirectional function to a data ID that varies for each piece of anonymized information and an individual password varies for each user, as a deletion password. Accordingly, anonymized information sharing apparatus 300a according to the present embodiment can ensure the anonymity of the sender of a deletion request message.

Anonymized information sharing apparatus 300a may apply a one-way function to other information that varies for each piece of anonymized information, such as a data ID only, or part or all of individual attribute information to generate a deletion password.

Furthermore, when applying a hash function to create an authentication ID, anonymized information sharing apparatus 300a may combine a deletion password and one of the time range, position range, and data ID that are included in anonymized information.

Furthermore, anonymized information sharing apparatus 300a may use a standard other than those used in the above examples to determine whether the individual identification risk is high. For example, anonymized information sharing apparatus 300a may determine that the individual identification risk is high if the user activities in the history are continuous for at least a predetermined time, and anonymized information sharing apparatus 300a may delete some pieces of the anonymized information to break the continuity.

Furthermore, a deletion request message may not be transmitted from the apparatus that has sent the anonymized information subject to deletion. For example, a deletion request message may be transmitted from another apparatus that can be regarded as the same apparatus from the viewpoint of the sender of anonymized information, such as the case where the user of the apparatus is identical to that of the sender of anonymized information. In this case, an apparatus that transmits a deletion request message needs to acquire the deletion password used by the apparatus that has sent anonymized information, by some type of secret communicating means. This type of system configuration also allows a sender of anonymized information to continuously manage the anonymized information.

Furthermore, although a one-way function is used as a hash function to generate a deletion password and an authentication ID in the above-described embodiments, other types of one-way functions may be used.

Furthermore, the process to be performed on shared anonymized information is not limited to deletion. For example, the present embodiment may employ various processes that can be permitted only to a sender of anonymized information, such as modification to the contents of anonymized information, change in the management status of anonymized information in another anonymized information sharing apparatus (prohibiting another apparatus from making the anonymized information available to a third party).

The disclosure of Japanese Patent Application No. 2010-177540, filed on Aug. 6, 2010, including the specification, drawings and abstract, is incorporated herein by reference in its entirety.

INDUSTRIAL APPLICABILITY

The apparatus and method for sharing anonymized information according to the claimed invention are useful as an apparatus and method for sharing anonymized information that can allow an apparatus that has sent anonymized information to be shared in a decentralized management network to continuously manage the anonymized information.

That is, the claimed invention is useful in the case where information that may identify the individual who has sent the information, such as position information of the user is shared in an information sharing system without an authorized central system, such as a peer-to-peer network.

Furthermore, the claimed invention is also useful in an information sharing system in which information is posted to a central system, in the case where information that may identify the individual that has sent the information, such as position information of a user is shared.

Furthermore, the claimed invention is applicable to a life stream service, which is a position sharing service in which a service provider does not manage the positions of users, such as twitter (registered trademark).

REFERENCE SIGNS LIST 100 anonymized information sharing system
200 communication network
300, 300a anonymized information sharing apparatus
310 information non-sharing section
320 authentication ID generating section
330 anonymizing section
340 information sharing section
350 anonymized information processing requesting section
360 anonymized information processing section
370a individual attribute information accumulating section
380a data ID storing section
390a individual identification risk monitoring section

The invention claimed is:

1. An anonymized information sharing apparatus that shares anonymized information with another apparatus, a sender of the anonymized information being anonymous, the apparatus comprising:
    an authentication ID generating section comprising a processor that generates a process password by applying a first one-way function to a combination of an individual password and a data ID and generates, for each piece of information to be shared, an authentication ID by applying a second one-way function to a combination of part or all of the information to be shared, the process password, and the data ID;
    an anonymizing section that generates the anonymized information by adding the generated authentication ID to the information to be shared;
    an information sharing section that sends the generated anonymized information to the other apparatus and causes the other apparatus to hold the generated anonymized information; and
    an anonymized information processing requesting section that generates and transmits a process request containing the process password to the other apparatus and requests the other apparatus to perform a predetermined process on the basis of a match between the authentication ID of the anonymized information held in the other apparatus and a result obtained by applying the second one-way function to the combination of part or all of the anonymized information held in the other apparatus, the process password, and the data ID, the predetermined process being permitted only by the sender.

2. The anonymized information sharing apparatus according to claim 1, wherein:
    the information sharing section holds the anonymized information sent to the other apparatus and anonymized information sent from the other apparatus;
    the anonymized information sharing apparatus further comprises an individual identification risk monitoring section that monitors a risk of the sender of the anonymized information sent to the other apparatus being identified, based on the anonymized information held in the information sharing section;
    the anonymized information processing requesting section requests the other apparatus to perform the predetermined process if the risk is high; and
    the predetermined process is a process of lowering the risk.

3. The anonymized information sharing apparatus according to claim 2, wherein the predetermined process includes deletion of the anonymized information held in the other apparatus.

4. An anonymized information sharing apparatus that shares anonymized information with another apparatus, a sender of the anonymized information being anonymous, the apparatus comprising:
    an authentication ID generating section comprising a processor that generates, for each piece of information to be shared, a process password by applying a first one-way function to a combination of an individual password and a data ID and an authentication ID by applying a second one-way function to a combination of part or all of the information to be shared and a process password;
    an anonymizing section that generates the anonymized information by adding the authentication ID to the information to be shared;

an information sharing section that sends the generated anonymized information to the other apparatus and causes the other apparatus to hold the generated anonymized information and holds the anonymized information sent to the other apparatus and anonymized information sent from the other apparatus;

an individual identification risk monitoring section that monitors a risk of the sender of the anonymized information sent to the other apparatus being identified, based on the anonymized information held in the information sharing section; and an anonymized information processing requesting section that, if the risk is high, generates and transmits a process request containing the process password to the other apparatus and requests the other apparatus to perform a process of lowering the risk for the anonymized information held in the other apparatus on the basis of a match between the authentication ID of the anonymized information held in the other apparatus and a result obtained by applying the second one-way function to the combination of part or all of the anonymized information held in the other apparatus and the process password.

5. A method of sharing anonymized information with another apparatus, a sender of the anonymized information being anonymous, the method comprising:

generating a process password by applying a first one-way function to a combination of an individual password and a data ID and generating, for each piece of information to be shared, an authentication ID by applying a second one-way function to a combination of part or all of the information to be shared, the process password, and the data ID;

generating the anonymized information by adding the generated authentication ID to the information to be shared;

sending the generated anonymized information to the other apparatus and causing the other apparatus to hold the generated anonymized information; and generating and transmitting a process request containing the process password to the other apparatus and requesting the other apparatus to perform a predetermined process on the basis of a match between the authentication ID of the anonymized information held in the other apparatus and a result obtained by applying the second one-way function to the combination of part or all of the anonymized information held in the other apparatus, the process password, and the data ID, the predetermined process being permitted only by the sender.

* * * * *